US011378195B2

(12) United States Patent
Karino et al.

(10) Patent No.: US 11,378,195 B2
(45) Date of Patent: Jul. 5, 2022

(54) REED VALVE

(71) Applicant: MIKUNI CORPORATION, Tokyo (JP)

(72) Inventors: Shingo Karino, Odawara (JP); Toshiaki Fujitani, Odawara (JP); Hiroyuki Kawarai, Odawara (JP); Mitsukuni Oyama, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/171,194

(22) Filed: Feb. 9, 2021

(65) Prior Publication Data

US 2021/0310572 A1 Oct. 7, 2021

(30) Foreign Application Priority Data

Apr. 6, 2020 (JP) .............................. JP2020-068127

(51) Int. Cl.
| F16K 15/16 | (2006.01) |
| F16K 1/20 | (2006.01) |
| F16K 31/06 | (2006.01) |
| F16K 27/02 | (2006.01) |

(52) U.S. Cl.
CPC ................ *F16K 15/16* (2013.01); *F16K 1/20* (2013.01); *F16K 1/2007* (2013.01); *F16K 27/0227* (2013.01); *F16K 31/0655* (2013.01); *F16K 31/0658* (2013.01); *Y10T 137/7891* (2015.04); *Y10T 137/7892* (2015.04)

(58) Field of Classification Search
CPC ......... Y10T 137/7891; Y10T 137/7892; Y10T 137/7893; F16K 15/16; F16K 1/2007; F16K 1/20; F16K 31/0655; F16K 31/0658; F16K 27/0227
See application file for complete search history.

(56) References Cited

U.S. PATENT DOCUMENTS

| 1,748,531 | A | * | 2/1930 | Troup | ..................... F16K 15/16 137/512.4 |
| 1,852,033 | A | * | 4/1932 | Summers | ................ F16K 15/16 137/857 |
| 1,892,711 | A | * | 1/1933 | Summers | ................ F16K 15/16 137/512.4 |
| 2,019,747 | A | * | 11/1935 | Taylor | ................. F04B 39/1073 137/454.4 |

(Continued)

FOREIGN PATENT DOCUMENTS

JP 2020012515 A 1/2020

*Primary Examiner* — Craig M Schneider
*Assistant Examiner* — Frederick D Soski
(74) *Attorney, Agent, or Firm* — Rossi, Kimms & McDowell LLP

(57) ABSTRACT

A reed valve 1 includes: a valve body 4; a valve seat 6 having a valve hole 3 for passage of a fluid J; a casing 8 accommodating the valve body 4; and a reed 10 including an arm part 18 having a first end portion 22 connected to the casing 8, and a valve body support part 20 connected to a second end portion 24 of the arm part 18 and supporting the valve body 4 so that the valve hole 3 can be opened and closed. When a first direction D1 is a flow direction of the fluid J in the valve hole 3, and a first surface 21 is a surface facing downstream in the first direction D1 among an inner surface of the casing 8, the first surface 21 includes a recess 27 facing the arm part 18.

9 Claims, 8 Drawing Sheets

(56) References Cited

U.S. PATENT DOCUMENTS

| | | | | |
|---|---|---|---|---|
| 2,476,320 A * | 7/1949 | Paulus | F16K 11/165 | 137/856 |
| 2,563,200 A * | 8/1951 | Venning | F16K 15/16 | 137/198 |
| 2,782,777 A * | 2/1957 | Jasper | F02B 75/16 | 123/73 V |
| 2,906,281 A * | 9/1959 | Pillote | F16K 11/052 | 137/119.01 |
| 3,200,838 A * | 8/1965 | Sheaffer | F01L 3/205 | 137/512.15 |
| 3,621,868 A * | 11/1971 | Wise | A62B 18/08 | 137/105 |
| 3,799,299 A * | 3/1974 | Cohen | F16F 9/50 | 188/282.5 |
| 3,807,444 A * | 4/1974 | Fortune | F16K 15/144 | 137/512.1 |
| 3,891,000 A * | 6/1975 | Melnick | F16K 31/08 | 137/855 |
| 3,926,214 A * | 12/1975 | Hrabal | F04B 39/1073 | 137/851 |
| 3,949,716 A * | 4/1976 | Liu | F02D 9/08 | 123/403 |
| 4,022,245 A * | 5/1977 | Davis | F16K 15/031 | 137/559 |
| 4,076,047 A * | 2/1978 | Akahori | F01L 3/205 | 137/856 |
| 4,082,295 A * | 4/1978 | Bainard | F01L 3/205 | 123/59.7 |
| 4,089,348 A * | 5/1978 | Yoshida | F16K 15/16 | 137/856 |
| 4,179,051 A * | 12/1979 | Thomas | A61M 3/0262 | 137/454.2 |
| 4,195,660 A * | 4/1980 | Taipale | F16K 15/16 | 137/512.1 |
| 4,228,770 A * | 10/1980 | Boyesen | F01L 3/205 | 123/188.1 |
| 4,257,458 A * | 3/1981 | Kondo | F16K 15/16 | 137/512.15 |
| 4,449,242 A * | 5/1984 | Sliney, Jr. | F16K 15/147 | 137/254 |
| 4,487,662 A * | 12/1984 | Fischbeck | F16K 99/0001 | 205/122 |
| 4,589,441 A * | 5/1986 | Campau | F16K 15/1848 | 137/512 |
| 4,633,825 A * | 1/1987 | Flaig | F01L 3/205 | 123/73 V |
| 4,696,263 A * | 9/1987 | Boyesen | F01L 3/205 | 123/65 V |
| 4,723,896 A * | 2/1988 | Fritchman | F04B 39/10 | 417/571 |
| 4,755,110 A * | 7/1988 | Bauer | F04B 39/0261 | 137/855 |
| 4,867,650 A * | 9/1989 | Ikeda | F04B 39/1073 | 417/269 |
| 4,951,617 A * | 8/1990 | Linamen | F02B 29/00 | 123/184.54 |
| 4,972,765 A * | 11/1990 | Dixon | B60H 1/248 | 137/855 |
| 4,978,285 A * | 12/1990 | Da Costa | F04B 39/1073 | 137/856 |
| 5,010,918 A * | 4/1991 | Tolsma | F01L 3/205 | 123/73 V |
| 5,228,468 A * | 7/1993 | Kapadia | F04B 53/105 | 137/1 |
| 5,265,646 A * | 11/1993 | Richardson | F04B 39/1073 | 137/512.15 |
| 5,325,892 A * | 7/1994 | Japuntich | A62B 18/025 | 137/855 |
| 5,345,970 A * | 9/1994 | Leyderman | F04C 29/128 | 137/856 |
| 5,355,910 A * | 10/1994 | Gies | B60H 1/249 | 137/858 |
| 5,373,867 A * | 12/1994 | Boyesen | F01L 3/205 | 123/73 V |
| 5,380,176 A * | 1/1995 | Kikuchi | F04C 29/128 | 137/856 |
| 5,421,368 A * | 6/1995 | Maalouf | F04C 29/12 | 137/856 |
| 5,601,118 A * | 2/1997 | Jang | F04C 29/128 | 137/856 |
| 5,632,609 A * | 5/1997 | Hashimoto | F04B 39/1073 | 417/571 |
| 5,647,395 A * | 7/1997 | Hashimoto | F16K 15/162 | 137/517 |
| 5,655,898 A * | 8/1997 | Hashimoto | F04B 39/1073 | 137/855 |
| 5,672,053 A * | 9/1997 | Sabha | F04B 39/1073 | 137/855 |
| 5,839,472 A * | 11/1998 | Shintoku | F04C 29/128 | 137/856 |
| 5,885,064 A * | 3/1999 | McCoy | F04B 39/1086 | 417/569 |
| 5,887,622 A * | 3/1999 | Ahn | F16K 15/162 | 137/856 |
| 6,006,786 A * | 12/1999 | Ito | F04C 29/128 | 137/857 |
| 6,099,275 A * | 8/2000 | Fraser | F04B 39/1073 | 417/569 |
| 6,102,680 A * | 8/2000 | Fraser | F04B 39/1073 | 137/246 |
| 6,196,815 B1 * | 3/2001 | Ohtake | F04C 29/128 | 137/856 |
| 6,231,315 B1 * | 5/2001 | Ikeda | F04B 39/1066 | 417/269 |
| 6,235,192 B1 * | 5/2001 | Melfi | B01D 35/15 | 137/856 |
| 6,336,795 B1 * | 1/2002 | Yamada | F04B 27/1009 | 137/855 |
| 6,454,545 B1 * | 9/2002 | Ikeda | F04B 39/1073 | 417/269 |
| 6,468,060 B1 * | 10/2002 | Dormer | F04B 39/1073 | 417/569 |
| 6,565,336 B1 * | 5/2003 | Fraser | F04B 39/1073 | 417/569 |
| 7,311,119 B2 * | 12/2007 | Takehana | F04B 53/105 | 137/315.33 |
| 10,174,756 B2 * | 1/2019 | Rodrigues | F04B 39/125 | |
| 10,240,829 B2 * | 3/2019 | Richardson | F16K 31/0644 | |
| 2002/0112768 A1 | 8/2002 | Okuyama | F01L 3/205 | 137/856 |
| 2002/0157717 A1* | 10/2002 | Hong | F16K 15/16 | 137/856 |
| 2002/0168278 A1* | 11/2002 | Jeon | F16K 99/0048 | 417/559 |
| 2003/0068245 A1* | 4/2003 | MacBain | F04B 39/1073 | 417/569 |
| 2003/0072660 A1* | 4/2003 | Lawson | F04B 39/0027 | 417/569 |
| 2004/0035468 A1* | 2/2004 | Shim | F04B 39/1073 | 137/514 |
| 2004/0065858 A1* | 4/2004 | Schroeder | F16K 31/0672 | 251/129.15 |
| 2004/0187941 A1* | 9/2004 | Seder | A61M 16/0468 | 137/855 |
| 2004/0216791 A1* | 11/2004 | Inui | F16K 15/16 | 137/856 |
| 2004/0250863 A1* | 12/2004 | Atkeson | F16K 25/005 | 137/855 |
| 2005/0098215 A1* | 5/2005 | Call | B60H 1/249 | 137/512.15 |
| 2006/0102113 A1* | 5/2006 | Tiller | F02M 35/116 | 123/65 V |
| 2006/0169329 A1* | 8/2006 | Camis, Jr. | F16K 15/144 | 137/512 |
| 2007/0148025 A1* | 6/2007 | Higashi | F04B 39/1073 | 417/559 |
| 2008/0202613 A1* | 8/2008 | Yamaoka | F04B 39/1073 | 137/855 |

(56) References Cited

U.S. PATENT DOCUMENTS

| | | | | |
|---|---|---|---|---|
| 2012/0121449 A1* | 5/2012 | Borst | .................... | F16K 15/031 |
| | | | | 417/559 |
| 2012/0132299 A1* | 5/2012 | Cyliax | ................ | F16K 27/0227 |
| | | | | 137/527 |
| 2012/0204333 A1* | 8/2012 | Serin | .................... | E03C 1/1225 |
| | | | | 4/211 |
| 2012/0207632 A1* | 8/2012 | Usui | .................. | F16K 15/1825 |
| | | | | 417/440 |
| 2012/0301341 A1* | 11/2012 | Ota | .................... | F04B 53/1047 |
| | | | | 417/559 |
| 2013/0340870 A1* | 12/2013 | Ito | ...................... | F04B 53/1087 |
| | | | | 137/855 |
| 2015/0354565 A1* | 12/2015 | Celata | ................... | F04C 15/068 |
| | | | | 418/221 |
| 2016/0348662 A1* | 12/2016 | Lilie | ...................... | F16K 15/16 |
| 2020/0025294 A1* | 1/2020 | Kimura | ................ | F16K 1/2007 |

* cited by examiner

REED VALVE

TECHNICAL FIELD

The present disclosure relates to a reed valve.

BACKGROUND

A reed valve includes a valve seat having a valve hole, and an elastically deformable reed for opening and closing the valve hole. Such a reed valve is in an open state where the reed is spaced from the valve seat when the fluid pressure of a fluid flowing through the valve hole acts on the reed. Further, the reed valve is in a closed state where the reed is in contact with the valve seat when the fluid pressure is low or zero. Patent Document 1 discloses an electromagnetic valve which uses electromagnetic force to keep the valve in the closed state, as an example of the reed valve.

CITATION LIST

Patent Literature

Patent Document 1: JP2020-012515A

SUMMARY

In the reed valve disclosed in Patent Document 1, the reed is fixed at one end and movable at the other end. A gap formed between the reed and the casing when the reed is spaced from the valve seat gradually decreases toward the one end. Therefore, if solid foreign matter mixed in the fluid is caught in or accumulated in this gap, a malfunction may occur in which the valve closed state cannot be maintained.

The present disclosure was made in view of the above problem, and an object thereof is to provide a reed valve that can suppress the occurrence of a malfunction due to foreign matter.

(1) A reed valve according to at least one embodiment of the present invention includes: a valve body; a valve seat having a valve hole for passage of a fluid; a casing accommodating the valve body; and a reed including an arm part having a first end portion connected to the casing, and a valve body support part connected to a second end portion of the arm part and supporting the valve body so as to allow the valve hole to be opened and closed. When a first direction is defined as a flow direction of the fluid in the valve hole, and a first surface is a surface facing downstream in the first direction among an inner surface of the casing, the first surface includes a recess facing the arm part.

(2) In some embodiments, in the reed valve described in the above (1), a width of the recess in a width direction of the arm part may be greater than a width of the arm part.

(3) In some embodiments, in the above configuration (1), when an extending direction is defined as a direction in which the arm part extends in a valve closed state where the valve body is in contact with the valve seat, a first end is one of both ends of the arm part at a side of the first end portion, and a second end is the other end of the arm part at a side of the second end portion, the recess may include an inclined surface inclined so that the recess increases in depth toward the first end in the extending direction.

(4) In some embodiments, in the above configuration (1), when an extending direction is defined as a direction in which the arm part extends in a valve closed state where the valve body is in contact with the valve seat, a first end is one of both ends of the arm part at a side of the first end portion, and a second end is the other end of the arm part at a side of the second end portion, the recess may be formed, in the extending direction, from a position between the valve hole and a supporting point of the arm part to a position between the supporting point and the first end.

(5) In some embodiments, in the above configuration (4), the recess may be formed from the position between the valve hole and the supporting point of the arm part to the position between the supporting point and the first end in the extending direction on both sides of the supporting point in a width direction of the arm part.

(6) In some embodiments, in the above configuration (1), the arm part may have a through hole penetrating the first end portion, and the first surface of the casing may have a protrusion configured to be inserted in the through hole. Additionally, when an extending direction is defined as a direction in which the arm part extends in a valve closed state where the valve body is in contact with the valve seat, a first end is one of both ends of the arm part at a side of the first end portion, a second end is the other end of the arm part at a side of the second end portion, and a first position is a position on a side surface of the protrusion closest to the second end in the extending direction, the recess may be formed, in the extending direction, from a position between the valve hole and the first position to a position between the first position and the first end.

(7) In some embodiments, in the above configuration (6), the recess may be formed from the position between the valve hole and the first position to the position between the first position and the first end in the extending direction on both sides of the through hole in a width direction of the arm part.

(8) In some embodiments, in the above configuration (1), the reed valve may further include a solenoid unit including a coil.

(9) In some embodiments, in the above configuration (8), the solenoid unit may include an outer yoke disposed on an outer peripheral side of the coil, and the recess may be recessed upstream in the first direction from a downstream end surface of the outer yoke in the first direction.

At least one embodiment of the present disclosure provides a reed valve that can suppress the occurrence of a malfunction due to foreign matter.

DETAILED DESCRIPTION

Embodiments of the present disclosure will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
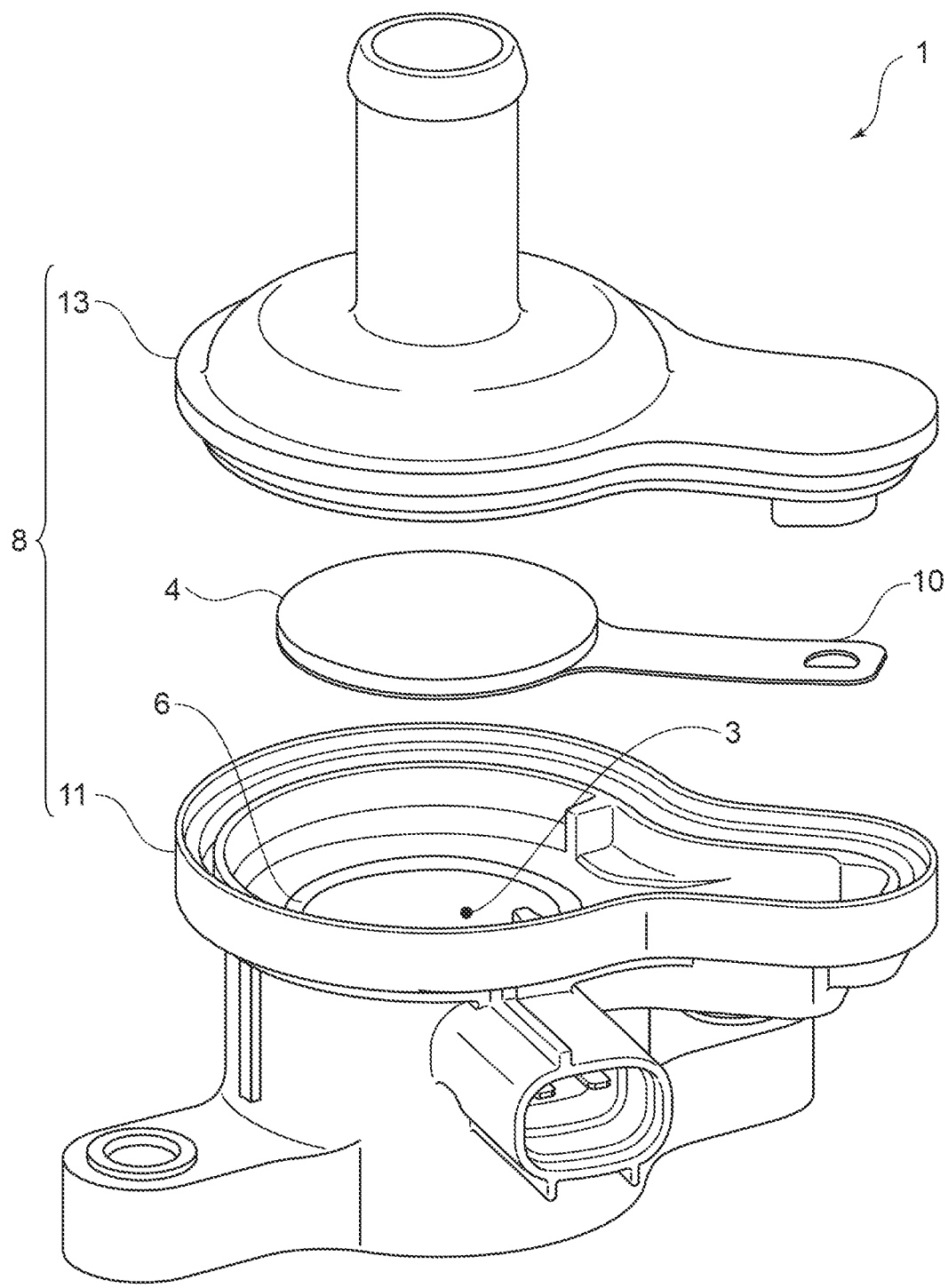
FIG. 1 is a schematic perspective view of the reed valve according to an embodiment of the present disclosure, where a part of the configuration of the reed valve is disassembled for explanation.
Figure 2:
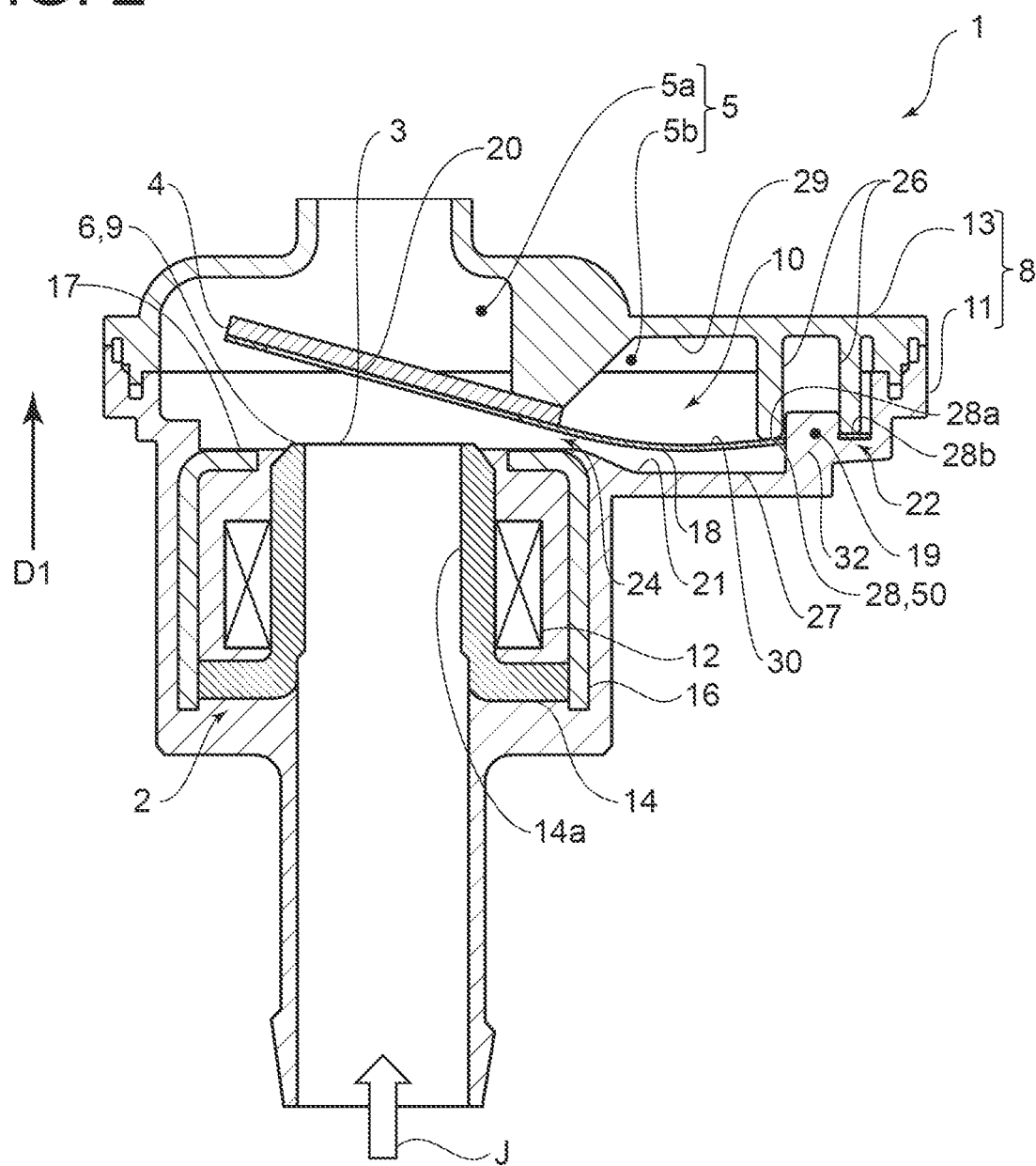
FIG. 2 is a cross-sectional view of the reed valve of FIG. 1 when the reed valve is in the valve open state.

A configuration of a reed valve 1 according to an embodiment of the present disclosure will now be described. As shown in FIG. 1, the reed valve 1 includes a valve body 4, a valve seat 6 having a valve hole 3, a casing 8, and a reed 10. Further, as shown in FIG. 2, the reed valve 1 further includes a solenoid unit 2. In the present disclosure, the reed valve 1 will be described with reference to an electromagnetic valve which uses electromagnetic force to keep the valve in the closed state where the valve hole 3 is closed by the valve body 4, as an example. However, the reed valve 1 of the present disclosure is not limited to an electromagnetic valve. For example, the reed valve 1 may be a valve without using electromagnetic force, which is configured such that, when the fluid pressure of a fluid flowing through the valve hole 3 acts on the valve body 4 or the reed 10, the valve is in the open state where the valve body 4 is spaced from the valve seat 6, and when the fluid pressure is equal to or less than a predetermined value, the valve is closed by elastic force of the reed 10. Alternatively, the reed valve 1 may be configured to be opened by the fluid pressure of the fluid, and to be closed by electromagnetic force and elastic force of the reed 10. The electromagnetic valve of the present disclosure is not limited to a particular use. For example, the valve may be used to open or close a passage through which cooling water (fluid J) of an engine flows.

The solenoid unit 2 includes a cylindrical coil 12, a cylindrical inner yoke 14 disposed on the inner peripheral side of the coil 12, and a cylindrical outer yoke 16 disposed on the outer peripheral side of the coil 12. The inner yoke 14 and the outer yoke 16 form a magnetic path when current is applied to the coil 12. In the present embodiment, an inner peripheral surface 14a of the inner yoke 14 forms a part of a passage through which the fluid J flows.

Figure 3:
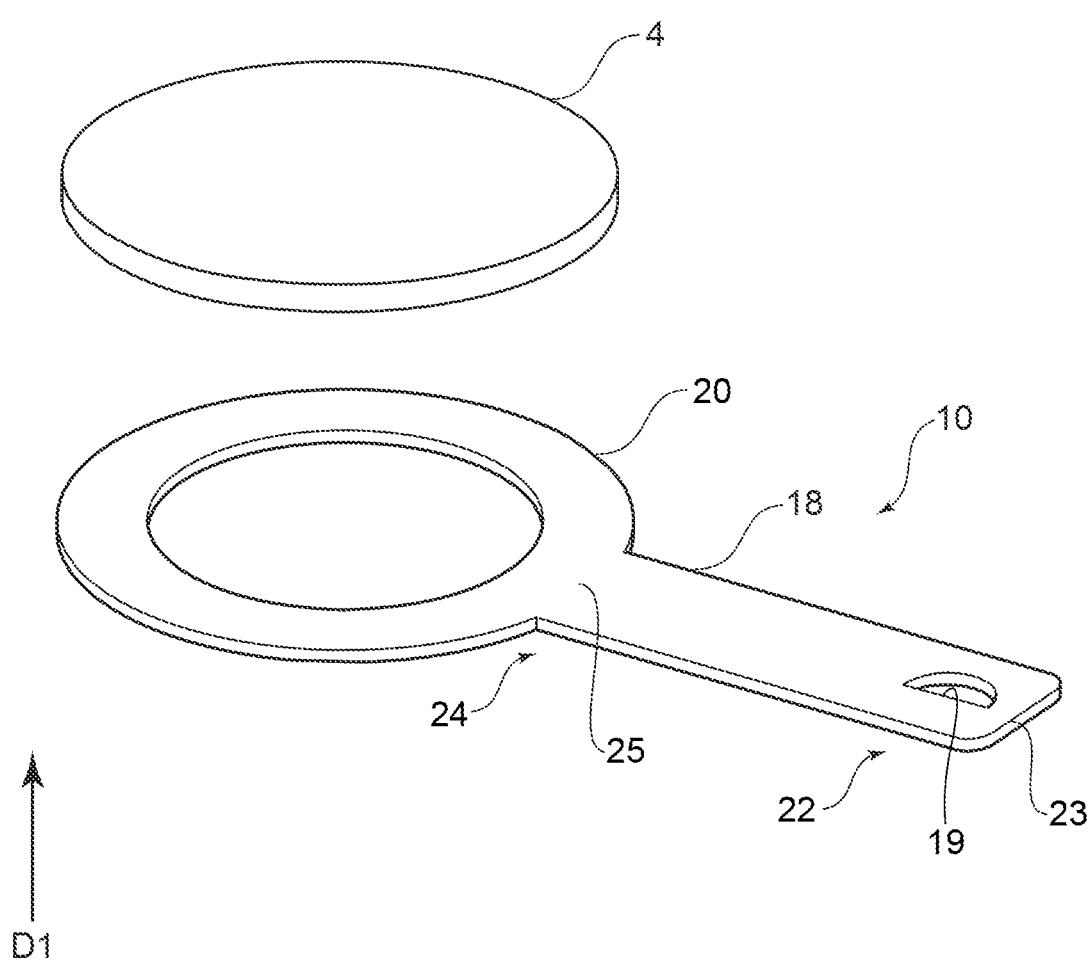
FIG. 3 is a schematic perspective view of the reed according to an embodiment of the present disclosure.

The valve body 4 is composed of a magnetic material and is attracted to the valve seat 6 by electromagnetic force generated when current is applied to the coil 12. The reed valve 1 having such a valve body 4 is closed when the valve body 4 is in press-contact with the valve seat 6 to close the valve hole 3, and is opened when the valve body 4 is spaced from the valve seat 6 to open the valve hole 3. In the present embodiment, as shown in FIG. 3, the valve body 4 has a disc shape.

The valve seat 6 has the valve hole 3 through which the fluid J can flow. In the present embodiment, as shown in FIG. 2, the valve seat 6 is formed on an end surface 9 of the inner yoke 14 on the downstream side with respect to the flow direction of the fluid J (hereinafter, referred to as end surface 9 of inner yoke 14). Further, the valve seat 6 slightly protrudes downstream in the flow direction of the fluid J from an end surface 17 of the outer yoke 16 on the downstream side with respect to the flow direction of the fluid J (hereinafter, referred to as end surface 17 of outer yoke 16). Hereinafter, the flow direction of the fluid J in the valve hole 3 will be referred to as "first direction D1". In some embodiments, the valve seat 6 may be formed by a first surface 21 of an upstream casing 11, which will be described later.

In the casing 8, an accommodation chamber 5 is formed for accommodating the valve body 4 and the reed 10. In the present embodiment, as shown in FIGS. 1 and 2, the casing 8 includes an upstream casing 11, and a downstream casing 13 disposed downstream of the upstream casing 11 in the first direction D1. An upstream end portion of the downstream casing 13 with respect to the first direction D1 is fitted in a downstream end portion of the upstream casing 11 with respect to the first direction D1. The accommodation chamber 5 is formed by being surrounded by the inner surface of the upstream casing 11 and the inner surface of the downstream casing 13.

In the present embodiment, the accommodation chamber 5 includes a valve body accommodation chamber 5a in which the valve body 4 is accommodated, and an arm part accommodation chamber 5b in which an arm part 18 of the reed 10, which will be described later, is accommodated. The arm part accommodation chamber 5b is arranged so as to be displaced from the valve body accommodation chamber 5a in a direction perpendicular to the first direction D1. Hereinafter, among the inner surface of the upstream casing 11, a surface that forms the arm part accommodation chamber 5b and faces downstream in the first direction D1 is referred to as "first surface 21", and among the inner surface of the downstream casing 13, a surface that forms the arm part accommodation chamber 5b and faces the first surface 21 is referred to as "second surface 29".

As shown in FIGS. 2 and 3, the reed 10 is composed of a plate spring and includes an arm part 18 and a valve body support part 20. The arm part 18 has a longitudinal shape extending in one direction, and is fixed at a first end portion 22 to the casing 8. The valve body support part 20 is connected to a second end portion 24 of the arm part 18. Further, the valve body support part 20 supports the valve body 4 so that the valve hole 3 can be opened and closed. The valve body 4 is fixed to the valve body support part 20 by, for example, welding.

In the present embodiment, as shown in FIG. 3, each of the arm part 18 and the valve body support part 20 has a plate shape. The valve body support part 20 further has an annular shape, and the outer diameter of the valve body 4 of disc shape is greater than the inner diameter of the valve body support part 20 of annular shape. Further, the inner diameter of the valve body support part 20 is greater than the outer diameter of the valve seat 6, so that the valve body 4 can be brought into contact with the valve seat 6 on the inner peripheral side of the valve body support part 20. The valve body support part 20 has a thickness equal to or less than the protrusion amount of the valve seat 6 described above. Hereinafter, a direction in which the arm part 18 extends in the valve closed state where the valve body 4 is in contact with the valve seat 6 is referred to as "extending direction D2". Further, one of both ends of the arm part 18 at a side of the first end portion 22 is referred to as a first end 23, and the other end of the arm part 18 at a side of the second end portion 24 is referred to as a second end 25.

An example of the method of fixing the first end portion 22 of the arm part 18 to the casing 8 will now be described. As shown in FIG. 3, the arm part 18 has a through hole 19 penetrating the first end portion 22 along the first direction D1. Further, as shown in FIG. 2, the downstream casing 13 includes a tubular projecting portion 26 protruding upstream in the first direction D1 from the second surface 29. A tip surface 28 of the projecting portion 26 abuts on a downstream surface 30 of the arm part 18 on the downstream side in the first direction D1. Further, the first surface 21 of the upstream casing 11 has a protrusion 32 configured to be inserted in the through hole 19 of the arm part 18. The protrusion 32 is also configured to be fitted in the inner surface of the projecting portion 26 of the downstream casing 13. That is, a portion of the tip surface 28 (top surface) of the tubular projecting portion 26 at a side of the second end 25 with respect to the protrusion 32 in the extending direction D2 functions as a supporting point 50 of the arm part 18.

Each of the through hole 19 and the protrusion 32 has a D-shape including a semi-circular cross-section, which has a function of preventing reverse assembly of the reed 10 (function of preventing the reed 10 from being attached to the upstream casing 11 in the wrong orientation). Further, a portion 28a of the tip surface 28 of the projecting portion 26 disposed at a side of the second end 25 with respect to the protrusion 32 in the extending direction D2 protrudes more upstream in the first direction D1 than a portion 28b of the tip surface 28 located at a side of the first end 23 with respect to the protrusion 32 in the extending direction D2. Further, the arm part 18 is held between the upstream casing 11 and the portion 28b of the tip surface 28 of the projecting portion 26 disposed at a side of the first end 23 with respect to the protrusion 32 in the extending direction D2. Meanwhile, the arm part 18 is not held between the upstream casing 11 and the portion 28a of the tip surface 28 of the projecting portion 26 located at a side of the second end 25 with respect to the protrusion 32 in the extending direction D2. That is, the size of a gap along the first direction D1 between the upstream casing 11 and the portion 28a of the tip surface 28 of the projecting portion 26 located at a side of the second end 25 with respect to the protrusion 32 in the extending direction D2 is greater than the thickness of the arm part 18. With this configuration, while ensuring the urging force for urging the valve body 4 to the valve seat 6, it is possible to suppress accumulation of foreign matter between the arm part 18 and the upstream casing 11.

Figure 4:
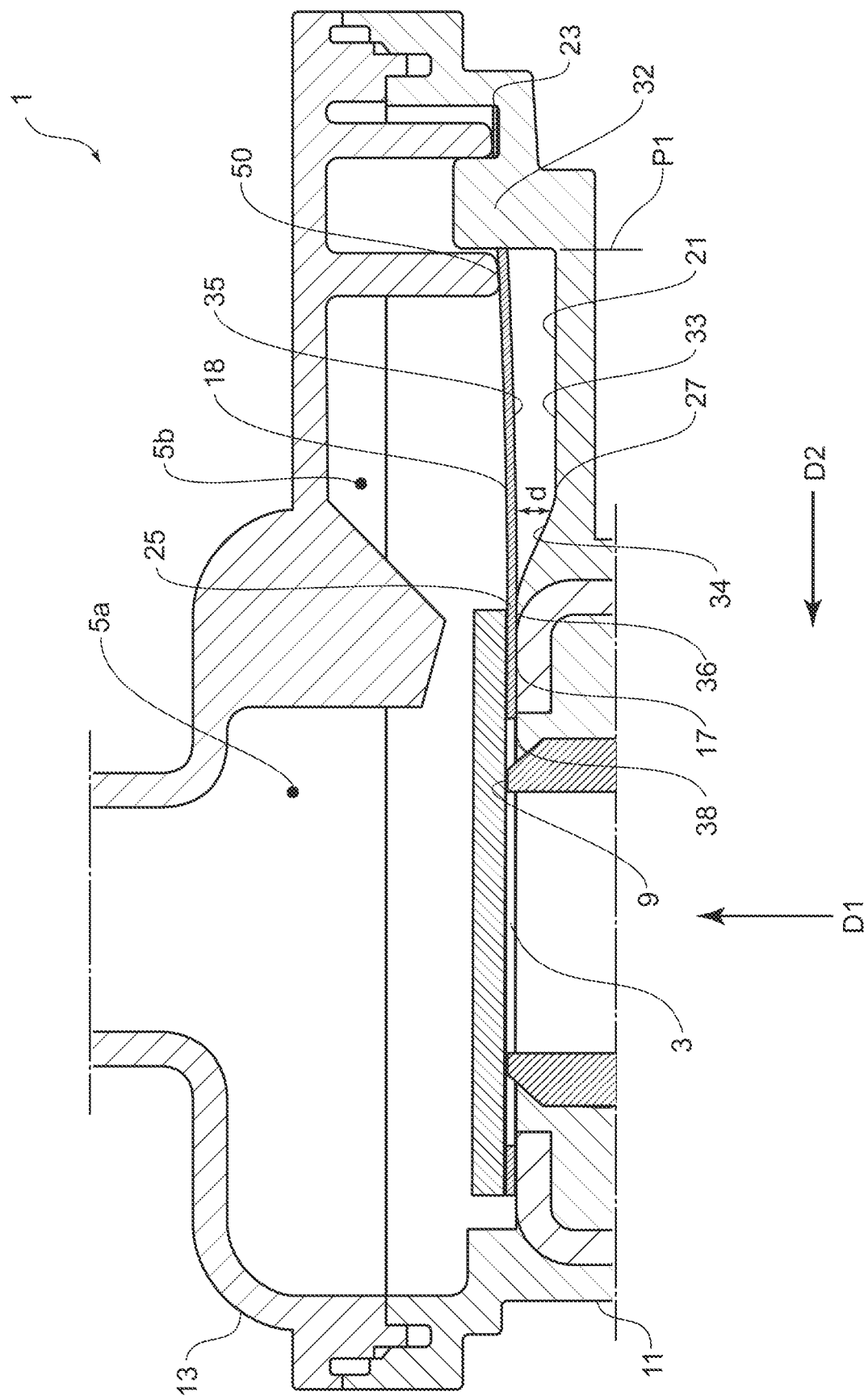
FIG. 4 is an enlarged view of the vicinity of the recess of FIG. 2 when the reed valve is in the valve closed state.

The recess 27 according to an embodiment of the present disclosure will be described with reference to FIG. 4. As shown in FIG. 4, the first surface 21 of the upstream casing 11 has a recess 27 facing the arm part 18. In the present embodiment, the recess 27 includes a bottom surface 33 and an inclined surface 34. Hereinafter, a position on the side surface of the protrusion 32 closest to the second end 25 in the extending direction D2 is referred to as "first position P1".

The bottom surface 33 of the recess 27 is located upstream of the downstream end surface 17 of the outer yoke 16 in the first direction D1. That is, the recess 27 is recessed upstream in the first direction D1 from the downstream end surface 17 of the outer yoke 16. Further, the bottom surface 33 of the recess 27 is formed along a plane perpendicular to the first direction D1 so that the depth of the recess 27 is constant.

The inclined surface 34 of the recess 27 is inclined so that the recess 27 increases in depth toward the first end 23 of the arm part 18 in the extending direction D2. A distance d between the inclined surface 34 and an upstream surface 35 of the arm part 18 on the upstream side in the first direction D1 increases toward the first end 23 of the arm part 18 in the extending direction D2 in a state where the valve body 4 is in contact with the valve seat 6 (valve closed state). The inclined surface 34 is connected to the bottom surface 33 at a portion where the distance d is a predetermined value.

In the present embodiments, the inner surface of the upstream casing 11 includes a first flat surface 36 and a second flat surface 38 which form the valve body accommodation chamber 5a. Each of the first flat surface 36 and the second flat surface 38 is a surface facing downstream in the first direction D1. The end surface 17 of the outer yoke 16 has a ring shape when viewed from downstream in the first direction D1. The first flat surface 36 is disposed on the outer peripheral side of the end surface 17 of the outer yoke 16 and is flush with the end surface 17 of the outer yoke 16. The second flat surface 38 is disposed on the inner peripheral side of the end surface 17 of the outer yoke 16 and is flush with the end surface 17 of the outer yoke 16.

A part of the first flat surface 36 is disposed between the inclined surface 34 and the end surface 17 of the outer yoke 16 in the extending direction D2, and connects the inclined surface 34 and the end surface 17 of the outer yoke 16. The part of the first flat surface 36 is, for example, a portion disposed at a side of the first end 23 of the arm part 18 with respect to the valve hole 3 in the extending direction D2. A part of the second flat surface 38 is disposed between the end surface 17 of the outer yoke 16 and the end surface 9 of inner outer yoke 14, and connects the end surface 17 of the outer yoke 16 and the end surface 9 of the inner yoke 14. The part of the second flat surface 38 is, for example, a portion disposed at a side of the first end 23 of the arm part 18 with respect to the valve hole 3 in the extending direction D2. In the extending direction D2, the bottom surface 33 of the recess 27, the inclined surface 34 of the recess 27, the part of the first flat surface 36, the end surface 17 of the outer yoke 16, the part of the second flat surface 38, and the end surface 9 of the inner yoke 14 (valve seat 6) are arranged in this order.

Figure 5:
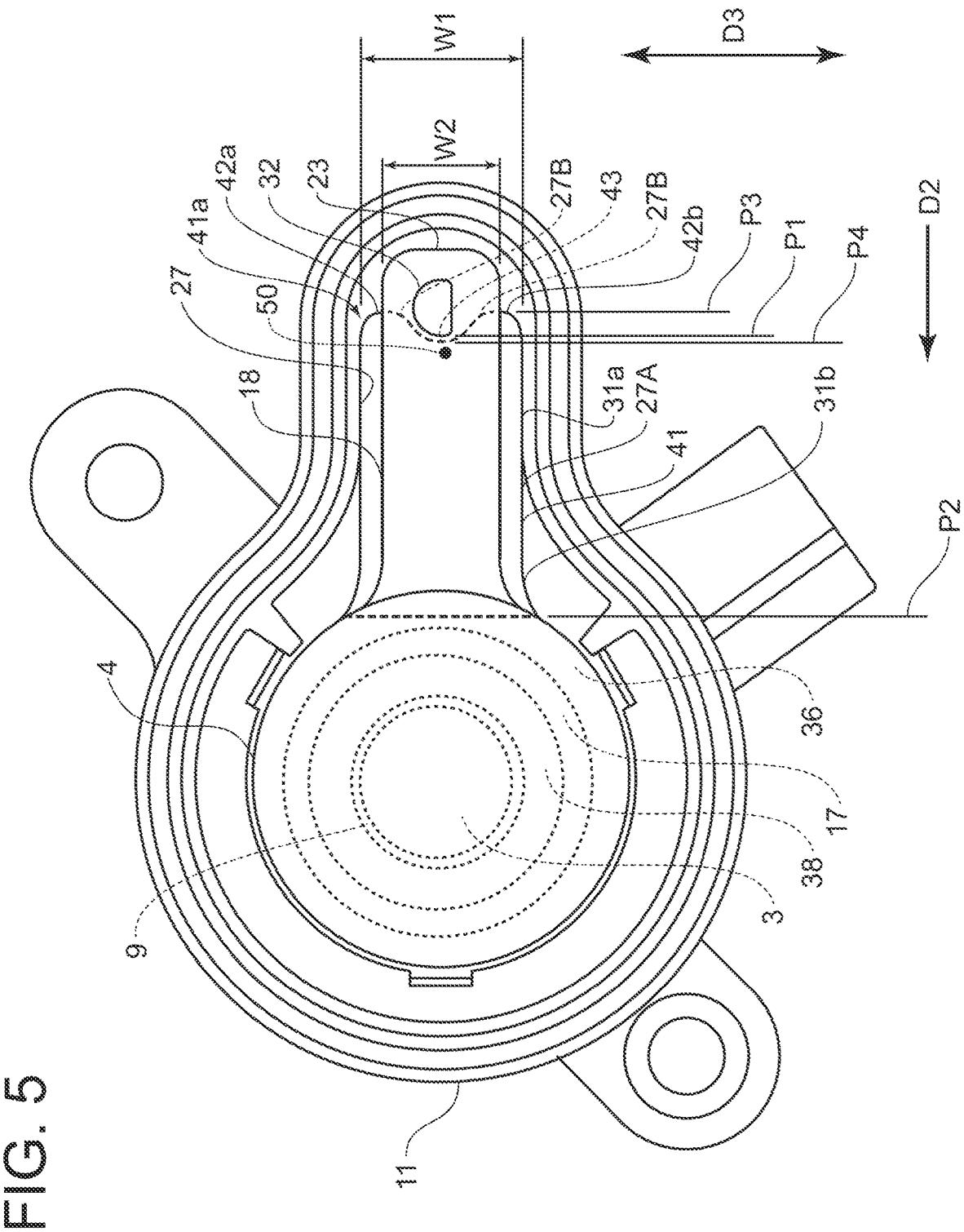
FIG. 5 is a diagram of the reed valve according to an embodiment of the present disclosure when viewed from downstream in the first direction, where the upstream casing is removed for explanation of the recess.

FIG. 5 is a diagram of the reed valve 1 when viewed from downstream in the first direction D1, where the upstream casing 11 is removed for explanation of the recess 27. Hereinafter, a position on the recess 27 closest to the second end 25 in the extending direction D2 is referred to as "second position P2". A position on the recess 27 closest to the first end 23 in the extending direction D2 is referred to as "third position P3".

In the present embodiment, as shown in FIG. 5, the width W1 of the recess 27 in the width direction D3 of the arm part 18 is greater than the width W2 of the arm part 18. Further, the recess 27 is formed from the second position P2 to the third position P3 on both sides of the supporting point 50 in the width direction D3 of the arm part 18. Further, in the embodiment shown in FIG. 5, the recess 27 is formed from the second position P2 to the third position P3 on both sides of the through hole 19 in the width direction D3 of the arm part 18. In the present disclosure, the width direction D3 of the arm part 18 is a direction perpendicular to the first direction D1 and the extending direction D2.

In the illustrated exemplary embodiment, the recess 27 has a bifurcated shape, and includes a main recess 27A and two sub recesses 27B, 27B extending from the main recess 27A toward the first end 23 in the extending direction D2. The main recess 27A is disposed in a range from a fourth position P4 between the first position P1 and the second position P2 to the second position P2 in the extending direction D2, and includes a first portion 31a with a constant width and a second portion 31b with a width gradually increasing toward the second end 25 of the arm part 18 in the extending direction D2. The second portion 31b is disposed at a side of the second end 25 of the arm part 18 with respect to the first portion 31a in the extending direction D2, and is connected to the first portion 31a. Each of the two sub recesses 27B, 27B is disposed in a range from the fourth position P4 to the third position P3 in the extending direction D2. Further, the sub recesses 27B, 27B are disposed on opposite sides of the protrusion 32. Further, in a plan view viewed from downstream in the first direction D1, a contour portion 41a, of a contour 41 of the recess 27, disposed at a side of the first end 23 of the arm part 18 from the fourth position P4 in the extending direction D2 includes two concave curved portions 42a, 42b which are concave toward the first end 23 of the arm part 18 in the extending direction D2, and a convex curved portion 43 which is convex toward the second end 25 of the arm part 18 in the extending direction D2 and connects the two concave curved portions 42a, 42b. One concave curved portion 42a is disposed on one side of the protrusion 32 in the width direction D3, and the other concave curved portion 42b is disposed on the other side of the protrusion 32 in the width direction D3. The convex curved portion 43 is smoothly curved along the side surface of the protrusion 32 so as to approach the second end 25 of the arm part 18 toward the center of the protrusion 32 in the width direction D3.

In the present embodiment, in the extending direction D2, the second position P2 is a position between the valve hole 3 and the supporting point 50 of the arm part 18, and the third position P3 is a position between the supporting point 50 of the arm part 18 and the first end 23 of the arm part 18. In the illustrated exemplary embodiment, in the extending direction D2, the second position P2 is a position between the valve hole 3 and the first position P1, and the third position P3 is a position between the first position P1 and the first end 23 of the arm part 18.

Figure 6:
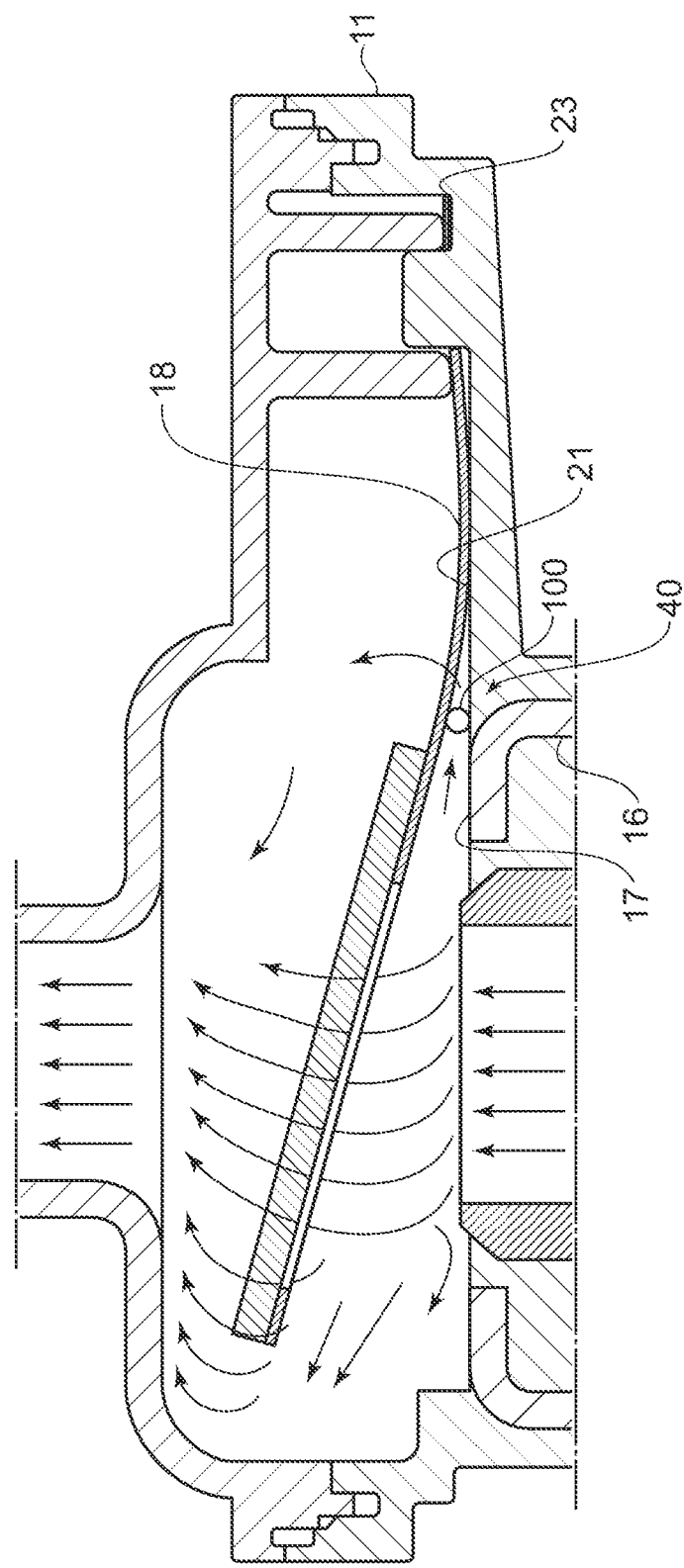
FIG. 6 is a diagram showing the flow of a fluid flowing in the reed valve according to a comparative example.

The operation and effect of the reed valve 1 according to an embodiment of the present disclosure will now be described. For example, as in a comparative example shown in FIG. 6, when the first surface 21 does not include the recess 27 facing the arm part 18 but is flush with the downstream end surface 17 of the outer yoke 16 in the first direction D1, a gap 40 formed between the arm part 18 and the first surface 21 of the upstream casing 11 gradually decreases toward the first end 23 of the arm part 18 in the extending direction. Therefore, if solid foreign matter 100 mixed in the fluid J is caught in or accumulated in the gap 40, a malfunction may occur in which the valve closed state cannot be maintained. The foreign matter 100 may be, for example, sand mixed in cooling water of an engine.

Figure 7:
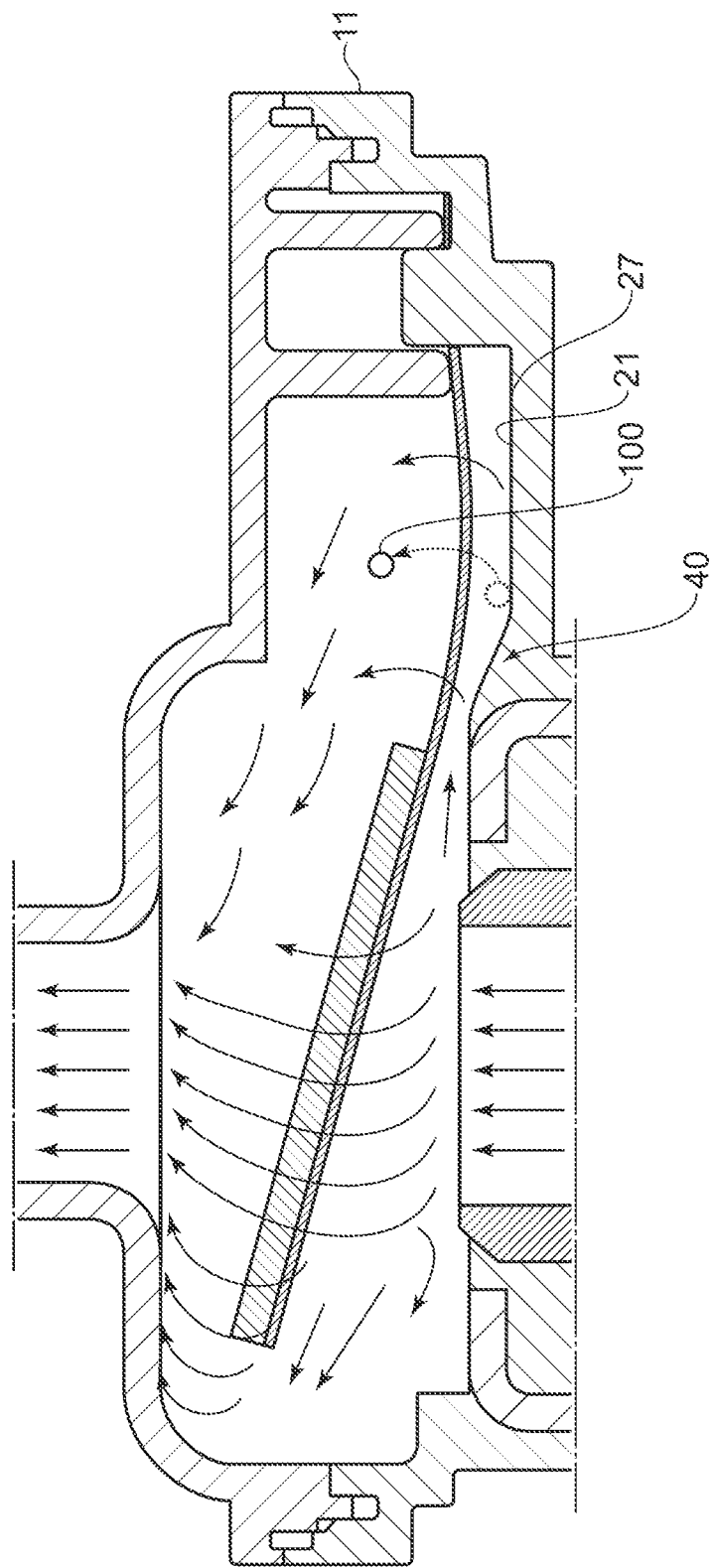
FIG. 7 is a diagram for describing the operation and effect of the reed valve according to an embodiment of the present disclosure.

However, according to the present embodiment, as shown in FIG. 7, since the first surface 21 of the upstream casing 11 has the recess 27 facing the arm part 18, compared with the comparative example, the gap 40 formed between the arm part 18 and the recess 27 of the first surface 21 of the upstream casing 11 increases, so that foreign matter 100 in the gap 40 can be discharged from the gap 40. Thus, it is possible to suppress catching and accumulating of foreign matter 100 in the gap 40, and suppress the occurrence of a malfunction in which the closed state of the reed valve 1 cannot be maintained. That is, it is possible to improve resistance to foreign matter of the reed valve 1.

Further, according to the present embodiment, since the width of the recess 27 in the width direction D3 of the arm part 18 is greater than the width of the arm part 18, foreign matter 100 in the gap 40 can be smoothly discharged from the recess 27.

Figure 8:
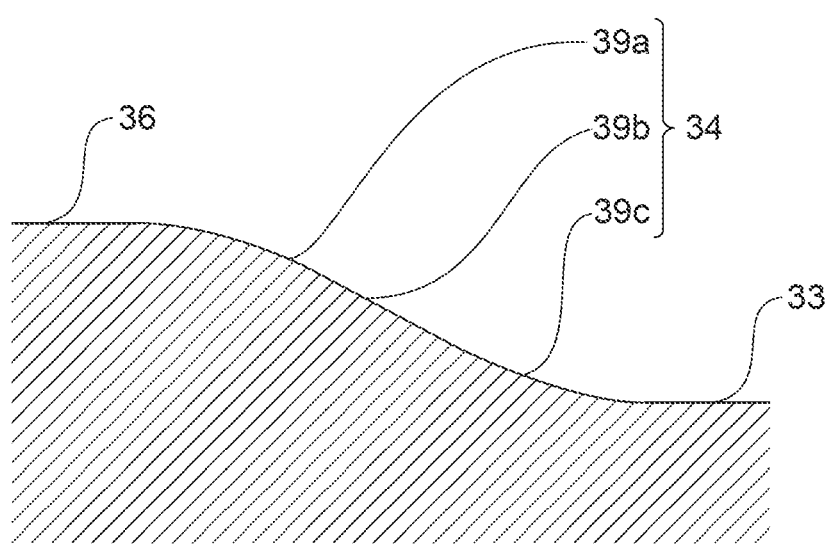
FIG. 8 is a schematic perspective view of the inclined surface according to some embodiments of the present disclosure.

Further, according to the present embodiment, since the inclined surface 34 is inclined so that the recess 27 increases in depth toward the first end 23 of the arm part 18 in the extending direction D2, foreign matter 100 in the gap 40 can be smoothly discharged from the recess 27 along the inclined surface 34. In some embodiments, as shown in FIG. 8, the inclined surface 34 includes a convex curved surface portion 39a whose outer shape in a cross-section along the extending direction D2 is curved convexly toward the downstream side in the first direction D1 over the entire width W1, a flat surface portion 39b whose outer shape is flat, and a concave curved surface portion 39c whose outer shape is curved concavely toward the upstream side in the first direction D1. In the extending direction D2, the convex curved surface portion 39a, the flat surface portion 39b, and the concave curved surface portion 39c are arranged in this order, and the convex curved surface portion 39a is connected to the first flat surface 36 at a side of the second end 25 of the arm part 18 in the extending direction D2, and the concave curved surface portion 39c is connected to the bottom surface 33 at a side of the first end 23 of the arm part 18 in the extending direction D2.

Further, according to the present embodiment, the recess 27 is recessed upstream in the first direction D1 from the end surface 17 of the outer yoke 16 on the downstream side in the first direction D1. With this configuration, the gap 40 between the arm part 18 and the recess 27 can be increased while reducing a distance between the outer yoke 16 and the valve body 4. Thus, it is possible to suppress catching and accumulating of foreign matter 100 in the gap 40 while increasing the force that attracts the valve body 4 to the valve seat 6 when the coil 12 is energized. As a result, it is possible to effectively suppress the occurrence of a malfunction in which the closed state of the reed valve 1 cannot be maintained.

Further, according to the present embodiment, the recess 27 is formed from the second position P2 between the valve hole 3 and the supporting point 50 of the arm part 18 to the third position P3 between the supporting point 50 of the arm part 18 and the first end 23 of the arm part 18 in the extending direction D2. Thus, the fluid J can be guided to the back of the supporting point 50 of the arm part 18, so that it is possible to effectively suppress catching and accumulating of foreign matter 100 in the gap 40 in the vicinity of the supporting point 50 of the arm part 18. Further, when the posture of the reed valve 1 is such that the first end 23 of the arm part 18 is below the second end 25 in the direction of gravity, a part of the recess 27 can function as a storage pocket for foreign matter 100 below the supporting point 50 of the arm part 18. Thus, it is possible to effectively suppress catching of foreign matter 100.

Further, according to the present embodiment, the recess 27 is formed from the second position P2 between the valve hole 3 and the supporting point 50 of the arm part 18 to the third position P3 between the supporting point 50 of the arm part 18 and the first end 23 of the arm part 18 in the extending direction D2 on both sides of the supporting point 50 of the arm part 18 in the width direction D3 of the arm part 18. Thus, the fluid J can be guided to the back of the supporting point 50 of the arm part 18 on both sides of the arm part 18, so that it is possible to effectively suppress catching and accumulating of foreign matter 100 in the gap 40 in the vicinity of the supporting point 50 of the arm part 18. Further, when the posture of the reed valve 1 is such that the first end 23 of the arm part 18 is below the second end 25 in the direction of gravity, a part of the recess 27 can function as a storage pocket for foreign matter 100 below the supporting point 50 of the arm part 18. Thus, it is possible to effectively suppress catching of foreign matter 100.

The reed valve according to an embodiment of the present invention has been described above, but the present invention is not limited thereto. Various modifications can be made without departing from the object of the present invention.

The invention claimed is:

1. A reed valve, comprising:
a valve body;
a valve seat having a valve hole for passage of a fluid;
a casing accommodating the valve body; and
a reed including an arm part having a first end portion connected to the casing, and a valve body support part connected to a second end portion of the arm part, the valve body support part supporting the valve body so as to allow the valve hole to be opened and closed,
wherein, when a first direction is defined as a flow direction of the fluid in the valve hole, and a first surface is a surface facing downstream in the first direction among an inner surface of the casing, the first surface includes a recess facing the arm part,
wherein the reed is disposed downstream of the first surface and the recess,
wherein, when an extending direction is defined as a direction in which the arm part extends in a valve closed state where the valve body is in contact with the valve seat, a first end of the arm part is at a side of the first end portion, and a second end of the arm part is at a side of the second end portion,
wherein the recess is formed, in the extending direction, from a position between the valve hole and a supporting point of the arm part to a position between the supporting point and the first end, and
wherein the recess is formed from the position between the valve hole and the supporting point of the arm part to the position between the supporting point and the first end in the extending direction on both sides of the supporting point in a width direction of the arm part.

2. The reed valve according to claim 1,
wherein a width of the recess in a width direction of the arm part is greater than a width of the arm part.

3. The reed valve according to claim 1,
wherein, when an extending direction is defined as a direction in which the arm part extends in a valve closed state where the valve body is in contact with the valve seat, a first end of the arm part is at a side of the first end portion, and a second end of the arm part is at a side of the second end portion, and wherein the recess includes an inclined surface inclined so that the recess increases in depth toward the first end in the extending direction.

4. The reed valve according to claim 1, further comprising a solenoid unit including a coil.

5. The reed valve according to claim 4,
wherein the solenoid unit includes an outer yoke disposed on an outer peripheral side of the coil, and
wherein, with respect to the first direction, the recess is recessed in an upstream direction from a downstream end surface of the outer yoke.

6. A reed valve, comprising:
a valve body;
a valve seat having a valve hole for passage of a fluid;
a casing accommodating the valve body; and
a reed including an arm part having a first end portion connected to the casing, and a valve body support part connected to a second end portion of the arm part, the valve body support part supporting the valve body so as to allow the valve hole to be opened and closed,
wherein, when a first direction is defined as a flow direction of the fluid in the valve hole, and a first surface is a surface facing downstream in the first direction among an inner surface of the casing, the first surface includes a recess facing the arm part,
wherein the arm part has a through hole penetrating the first end portion,
wherein the first surface of the casing has a protrusion configured to be inserted in the through hole, and
wherein, when an extending direction is defined as a direction in which the arm part extends in a valve closed state where the valve body is in contact with the valve seat, a first end of the arm part is at a side of the first end portion, a second end of the arm part is at a side of the second end portion, and a first position is a position on a side surface of the protrusion closest to the second end in the extending direction, and
wherein the recess is formed, in the extending direction, from a position between the valve hole and the first position to a position between the first position and the first end.

7. The reed valve according to claim 6,
wherein the recess is formed from the position between the valve hole and the first position to the position between the first position and the first end in the extending direction on both sides of the through hole in a width direction of the arm part.

8. The reed valve according to claim 6,
wherein the recess is formed, in the extending direction, from a position between the valve hole and a supporting point of the arm part to a position between the supporting point and the first end in the extending direction on both sides of the supporting point in a width direction of the arm part.

9. A reed valve, comprising:
a valve seat having a valve hole for passage of a fluid;
a valve body having a contact portion which comes into contact with the valve seat when the reed valve is closed;
a casing accommodating the valve body; and
a reed including a valve body support having an annular shape around the contact portion of the valve body, and an arm part extending from a first end connected to the casing to a second end connected to the valve body support,
wherein the casing includes: a recess disposed in a radially outward region of the valve seat such that a bottom of the recess faces the arm part of the reed; and a ridge disposed around the valve seat in a radially intermediate region between the recess and the valve seat, the bottom of the recess being disposed such that a first axial distance between the valve seat and the bottom of the recess is greater than a second axial distance between the valve seat and the ridge.

* * * * *